(12) United States Patent
Lin et al.

(10) Patent No.: US 10,290,211 B2
(45) Date of Patent: May 14, 2019

(54) ELECTRONIC FENCE (E-FENCE) CONTROL TECHNOLOGY FOR DOCKLESS SHARING VEHICLES

(71) Applicant: China Superoo Network Technology Co., Ltd, Beijing (CN)

(72) Inventors: Shaorong Lin, Beijing (CN); Zijie Hu, Beijing (CN); Xinbo Wang, Beijing (CN); Angyun Li, Beijing (CN)

(73) Assignee: CHINA SUPEROO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/730,026

(22) Filed: Oct. 11, 2017

(65) Prior Publication Data

US 2018/0330614 A1     Nov. 15, 2018

(30) Foreign Application Priority Data

May 12, 2017   (CN) .......................... 2017 1 0334984

(51) Int. Cl.
  *G08G 1/14*     (2006.01)
  *B62H 5/00*     (2006.01)
  (Continued)

(52) U.S. Cl.
  CPC .............. *G08G 1/144* (2013.01); *B62H 5/00* (2013.01); *B62H 5/20* (2013.01); *G07F 17/0057* (2013.01);
  (Continued)

(58) Field of Classification Search
  CPC ............ B64C 39/024; B64C 2201/126; B64C 2201/146; B64C 19/00; B64C 2201/024;
  (Continued)

(56) References Cited

U.S. PATENT DOCUMENTS

| 9,157,742 | B1  | 10/2015 | Fahrner et al. |
| 2002/0132702 | A1* | 9/2002 | Muramoto ............... B60T 7/12 |
| | | | 477/183 |

(Continued)

FOREIGN PATENT DOCUMENTS

| CN | 101587636 A | 11/2009 |
| CN | 102426781 A | 4/2012 |

(Continued)

OTHER PUBLICATIONS

Office Action from the corresponding Chinese application, dated Oct. 16, 2017, 6 pages.

(Continued)

*Primary Examiner* — Daniel Previl
(74) *Attorney, Agent, or Firm* — Muncy, Geissler, Olds & Lowe, P.C.

(57) ABSTRACT

The present disclosure discloses a dockless vehicle-based electric fence control method. The method comprises: demarcating and forming, by a backend server, a non-parking area and/or a riding boundary of a vehicle by using a map engine tool, wherein longitude and latitude coordinates at which the non-parking area and/or the riding boundary is located is stored into a database of the backend server; when ride comes to an end, sending, by a mobile terminal or intelligent hardware installed in a ridden vehicle, the parking position coordinates of a current vehicle to the backend server; and receiving, by the backend server, parking position coordinates of the vehicle, comparing the parking position coordinates of the vehicle with the database, determining whether the parking position coordinates of the current vehicle are located in the non-parking area or beyond the riding boundary, and feeding back a determining result to the mobile terminal and/or the intelligent hardware. According to the present disclosure, existing problems that shared vehicles are inappropriately parked and placed and (Continued)

there is no riding boundary, which hinder management and operation of vehicles, are solved. By setting a virtual electric fence, as well as related non-parking areas and riding boundaries, parking of vehicles is regulated, and management is strengthened.

10 Claims, 4 Drawing Sheets

(51) Int. Cl.
    *B62H 5/20*     (2006.01)
    *G07F 17/00*     (2006.01)
    *H04W 4/021*     (2018.01)
    *G08G 1/00*     (2006.01)

(52) U.S. Cl.
    CPC ............ *G08G 1/149* (2013.01); *G08G 1/207* (2013.01); *H04W 4/021* (2013.01)

(58) Field of Classification Search
    CPC ........ B64C 2201/123; B64C 2201/141; B64C 27/08; B64C 39/02; G08G 5/0069; G08G 5/0013; G08G 5/0026; G08G 5/006; G08G 5/04
    USPC ....... 340/932.2, 425.5, 426.1, 429, 937–938, 340/958, 990, 995.1, 426.16, 426.19, 340/426.22, 432, 441, 457
    See application file for complete search history.

(56) References Cited

U.S. PATENT DOCUMENTS

| | | |
|---|---|---|
| 2009/0009321 A1 | 1/2009 | McClellan et al. |
| 2011/0133918 A1 | 6/2011 | Lee et al. |
| 2011/0307394 A1 | 12/2011 | Rzepecki |
| 2012/0143401 A1 | 6/2012 | Jayadevappa et al. |
| 2016/0025214 A1* | 1/2016 | Yoshida .................. F16H 63/48 701/45 |
| 2016/0152224 A1* | 6/2016 | Tabata ................. B60W 10/115 701/22 |
| 2017/0089711 A1* | 3/2017 | Bae .................... G01C 21/3461 |
| 2017/0200367 A1* | 7/2017 | Mielenz ............... B60W 30/06 |
| 2017/0323227 A1* | 11/2017 | Sadeghi ................. G06Q 10/02 |
| 2017/0344003 A1* | 11/2017 | Bostick ................ B60W 30/00 |
| 2018/0053417 A1* | 2/2018 | Rolf ....................... G08G 1/143 |

FOREIGN PATENT DOCUMENTS

| | | |
|---|---|---|
| CN | 103247171 A | 8/2013 |
| CN | 102426781 B | 12/2013 |
| WO | WO 2016/023131 A1 | 2/2016 |

OTHER PUBLICATIONS

Office Action from the corresponding European application, dated Oct. 1, 2018, 8 pages.

\* cited by examiner

ELECTRONIC FENCE (E-FENCE) CONTROL TECHNOLOGY FOR DOCKLESS SHARING VEHICLES

TECHNICAL FIELD

The present disclosure belongs to the technical field of unmanned driving, and particularly relates to a dockless vehicle-based electric fence control method.

BACKGROUND

Shared bicycles refer to a bicycle sharing service provided by enterprises in campuses, at metro stations and bus stations, and in residential areas, business districts, common service areas, and the like, in a new form of sharing economy. Enabling a bicycle-sharing app, a user can view a diagram of distribution of nearby rentable bicycles and make a reservation. After finding a bicycle, the user can unlock the bicycle by scanning a QR code with a mobile phone and ride the bicycle. When the riding comes to an end, the user parks the bicycle freely, locks the bicycle, and the using process is then finished. Compared with docked public bicycles, this "dockless" concept that bicycles can be used and parked readily brings about great convenience to citizens, but at the same time it makes the phenomena that the bicycles disorderly occupy the road and are randomly parked more common. This affects urban space management and urban beautification, and makes them more difficult to implement. To solve the problem that the shared bicycles are parked disorderly, currently, the RFID technology and the Bluetooth technology are used to define parking areas in public places, and the shared bicycles near the places need to be placed in the defined areas. However, these technologies definitely deprive the parking convenience of the "dockless" shared bicycles, and make the "dockless" shared bicycles inconvenient the same as the previous-generation docked shared bicycles. Since the shared bicycles are provided with electric docks and become docked vehicles, it is still inconvenient for users to use. In addition, to date, a large number of shared bicycle products are not controlled within a riding boundary. This causes the emergence of a large number of zombie bicycles and an increase in operation costs, and hinders management and operation of the vehicles.

Therefore, how to design a dockless electric fence control method for controlling random parking of the shared bicycles and controlling riding within certain coverage now becomes a technical problem that needs to be urgently solved.

SUMMARY OF THE INVENTION

Based on the foregoing disadvantages in the prior art, an objective of the present disclosure is to provide a dockless vehicle-based electric fence control method, to solve the current problems that shared bicycles are disorderly parked and placed and no riding boundary is demarcated, which hinder management and operation of vehicles.

To resolve the foregoing technical problems, the present disclosure provides a dockless vehicle-based electric fence control method, comprising:

demarcating and forming, by a backend server, a non-parking area of a vehicle by using a map engine tool, and storing longitude and latitude coordinates of the non-parking area into a database of the backend server;

when a ride comes to an end, sending, by a mobile terminal or intelligent hardware installed in a ridden vehicle, the parking position coordinates of a current vehicle to the backend server; and receiving, by the backend server, the parking position coordinates of the vehicle, calling a database for comparison, determining whether the parking position coordinates of the current vehicle are located in the non-parking area, and feeding back a determining result to the mobile terminal and/or the intelligent hardware.

Further, the method comprises: demarcating and forming, by the backend server, a riding boundary of the vehicle by using the map engine tool, and storing a longitude and latitude coordinates of the riding boundary into the database of the backend server;

after the ride is finished, sending, by the mobile terminal or the intelligent hardware installed in the ridden vehicle, the parking position coordinates of the current vehicle to the backend server; and receiving, by the backend server, the parking position coordinates of the vehicle for comparison with the database, and determining whether the parking position coordinates of the current vehicle are beyond the riding boundary;

wherein, the coverage of the riding boundary is not less than the coverage of the non-parking area as set.

Further, the method further comprises: when it is determined that the parking position of the current vehicle is located in the demarcated coverage of the non-parking area or beyond the riding boundary, pushing, by the backend server, a message to the mobile terminal and/or issuing an alarm instruction to the intelligent hardware in the vehicle for alarming.

Further, the method comprises: determining the position in a real-time way and wirelessly sending, by the mobile terminal, the current position of the ridden vehicle to the backend server; and receiving, by the backend server, the current position of the ridden vehicle sent by the mobile terminal, calculating a non-parking area within the nearby area (such as the area within 500 meters from the position), and returning the non-parking area to the mobile terminal for displaying.

Further, the method for demarcating the map engine tool comprises: redeveloping a region engine tool to enable the region engine tool to draw a geometric figure on a map by using one or more of a point, a line segment, a circle, and a polygon to form the non-parking area and the riding boundary.

Further, the method comprises: rendering, by an api interface of the map engine tool, the formed non-parking area and riding boundary, and highlighting the formed non-parking area and riding boundary on a mobile terminal screen of a user.

Further, the method comprises: editing and modifying the geometric figure drawn of the non-parking area and the riding boundary, to complete the updating of the non-parking area and the riding boundary.

Further, the method comprises: within a riding process of the user, continuously requesting, by the mobile terminal, the backend server for data synchronization rendering.

Further, the method comprises: when a user' riding trip comes to an end, sending to the backend server, by the mobile terminal, an instruction request for finishing the trip, and a coordinate information of the real-time position; or, locking an intelligent electronic lock of the vehicle, so that the intelligent hardware sends, to the backend server, an instruction message for finishing the trip.

Further, the method comprises: when the ride comes to an end, and it is determined by the backend server that the parking position coordinates of the vehicle are located in a non-parking area or beyond the riding boundary, pushing, by the backend server, a message to the mobile terminal and/or issuing an alarm instruction to the intelligent hardware in the vehicle for alarming, wherein the backend server further sets a handling time for the inappropriately parked vehicle and waits until the vehicle is unlocked and ridden away, and if it is not found by the backend server that the lock is re-unlocked within a set time, the backend server repeatedly reminds the mobile terminal and/or repeats the alarming. After receiving the reminding push message and/or hearing the alarm, the user needs to re-unlock the vehicle and move the vehicle to a parking area and/or ride the bicycle back to the coverage of the boundary. Otherwise, the user suffers corresponding pecuniary losses and credit losses. When detecting that the user re-unlocks the intelligent lock installed on the vehicle, the backend server stops issuing the alarm instruction, the alarm is released immediately, and at the same time, the backend server displays that the vehicle enters into the normal use state again, until the user parks the vehicle in a parking area and/or rides the vehicle back to the boundary. If the user fails to act timely within the set time, the backend server sends a reminding instruction to a vehicle management platform and labels the position of the vehicle after the set time, and waits for handling by a person in charge of operation and maintenance.

Further, the method comprises: only when the vehicle is near to the riding boundary as set, the mobile terminal voluntarily display the geometric figure corresponding to riding boundary that is returned to the mobile terminal. However, in normal cases, only the geometric figure of the non-parking area is returned to the mobile terminal of the user for displaying.

Compared with the prior art, according to the dockless vehicle-based electric fence control method disclosed in the present disclosure, convenience of parking the existing dockless shared bicycles is reserved, and the legitimate interests of public and private non-parking areas are ensured. In this method, only by a dedicated APP installed on a client-side, a user can be aware of the non-parking areas and riding boundaries at a glance during a riding and parking process. Compared with the original manner in which an off-line electric fence is set by using the RFID and Bluetooth technology, a large amount of manpower and material resources can be saved. It is convenient, and in the meantime manages the parking of the vehicles. The method is an innovation of electric fence technologies in the field of shared bicycles.

BRIEF DESCRIPTION OF THE DRAWINGS

To describe the technical solutions in the embodiments of the present disclosure or in the prior art more clearly, the following briefly introduces the accompanying drawing required for describing the embodiments and the prior art. Apparently, the accompanying drawings in the following description show some embodiments of the present disclosure, and a person of ordinary skill in the art may derive other drawings from these accompanying drawings without creative efforts.

DETAILED DESCRIPTION OF THE INVENTION

To make a person skilled in the art understand the technical solutions in the present disclosure better, the following further describes the present disclosure in detail with reference to the accompanying drawings and specific embodiments.

In the prior art, disorderly parking and placing of shared bicycles are social governance problems existing currently. Even if the radio frequency or the Bluetooth technology are used to define particular vehicle parking areas in public places, this manner is still based on the "docked parking" concept, and loses the convenience that the shared bicycles originally have.

The present disclosure is directed to solve a contradiction between the convenience of parking of current dockless shared bicycles and the compliance with the law in terms of parking, and to effectively manage and maintain vehicle parking areas by setting dockless non-parking areas and riding boundaries.

Embodiments of the present disclosure provide a dockless vehicle-based electric fence control method. In the control method, a backend server and a front-end mobile terminal are used. By means of data communication and data interaction between the backend server and the front-end mobile terminal, and between the backend server and intelligent hardware in a vehicle, a dockless electric fence is defined and whether the vehicle is illegally parked is determined.

It should be noted that, dockless vehicles in the embodiments of the present disclosure generally refer to all vehicles that can be parked, used and shared readily, and include but are not limited to bicycles, electric bicycles, electric motors, and electric cars.

The backend server in the embodiments of the present disclosure generally refers to a device providing computing services. Components of the backend server include a processor, a hard disk, a memory, a system bus, and the like. The server is similar to a general-purpose computer architecture, and has a relatively high requirement on processing capabilities, stability, reliability, security, extensibility, manageability, and the like, because the server needs to provide highly reliable services. Therefore, the server should have a high-speed computing capability, a long-time reliable operation, and a strong throughput capability for external data.

The mobile terminal in the embodiments of the present disclosure generally refers to a computer device that can be used while moving, and includes but is not limited to a smartphone, a notebook computer, a tablet computer, a vehicle-mounted computer. In a hardware system, the mobile terminal should have a central processing unit, a storage, an input component, and an output component, and is equivalent to a microcomputer device with a communication function. In addition, the mobile terminal may also have various input manners, such as perform inputting by using a keyboard, a mouse, a touchscreen, a transmitter, a camera, and the like, and may adjust inputs as required. In addition, the mobile terminal has various output manners, such as perform outputting by using a receiver, a display, and the like, and may perform adjustment as required. In a software system, the mobile terminal has corresponding operating systems, such as Windows Mobile, Symbian, Palm, Android, and iOS. In addition, based on these open operating system platforms, personalized application software may be developed. In terms of communication capabilities, the mobile terminal should have flexible access modes and high-bandwidth communication performance, and it can automatically adjust a selected communication mode according to a selected service and an environment, thereby facilitating use of riders. The mobile terminal may support GSM, WCDMA, CDMA2000, TDSCDMA, NB-IoT, WiFi, WiMAX, Bluetooth, and the like, and may be applied to networks of different standards such as 2G, 3G, 4G, and 5G The mobile terminal not only supports a voice service, but also supports multiple wireless data services. The mobile terminal in the embodiments of the present disclosure has at least a GPS positioning and wireless communication function. An app installed on a client for map identification may be installed on the mobile terminal for map displaying. For ease of describing functions implemented by the mobile terminal, in an entire interaction procedure shown in FIG. 3 of the embodiments, the mobile terminal is replaced with a client. The client corresponds to the server and provides a local application program for a user. The client is installed on the mobile terminal.

The intelligent hardware in the embodiments of the present disclosure refers to an intelligent IoT lock gadget that is installed on the shared bicycles and is capable of communicating with a server by using Bluetooth, a mobile communications network (including 2G, 3G, 4G or a higher-generation network), NFC, or an NBLT network, and that with a positioning function (for example, is capable of performing positioning by using a GPS satellite) and a battery and a lock apparatus. A person skilled in the art may understand that a smartphone is preferred as the mobile terminal in the present disclosure. However, it cannot be denied that, the mobile terminal may further be installed in an embedded manner on a shared vehicle in the form of a microcomputer. As a part of the shared bicycle, the mobile terminal has a display facing a user screen.

Figure 1:
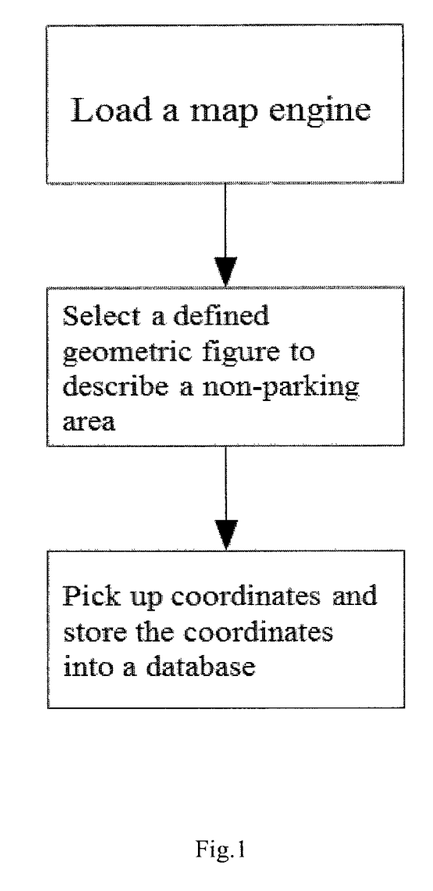
FIG. 1 is a schematic workflow diagram of a backend server in a dockless vehicle-based electric fence control method according to an embodiment of the present disclosure.
Figure 2:
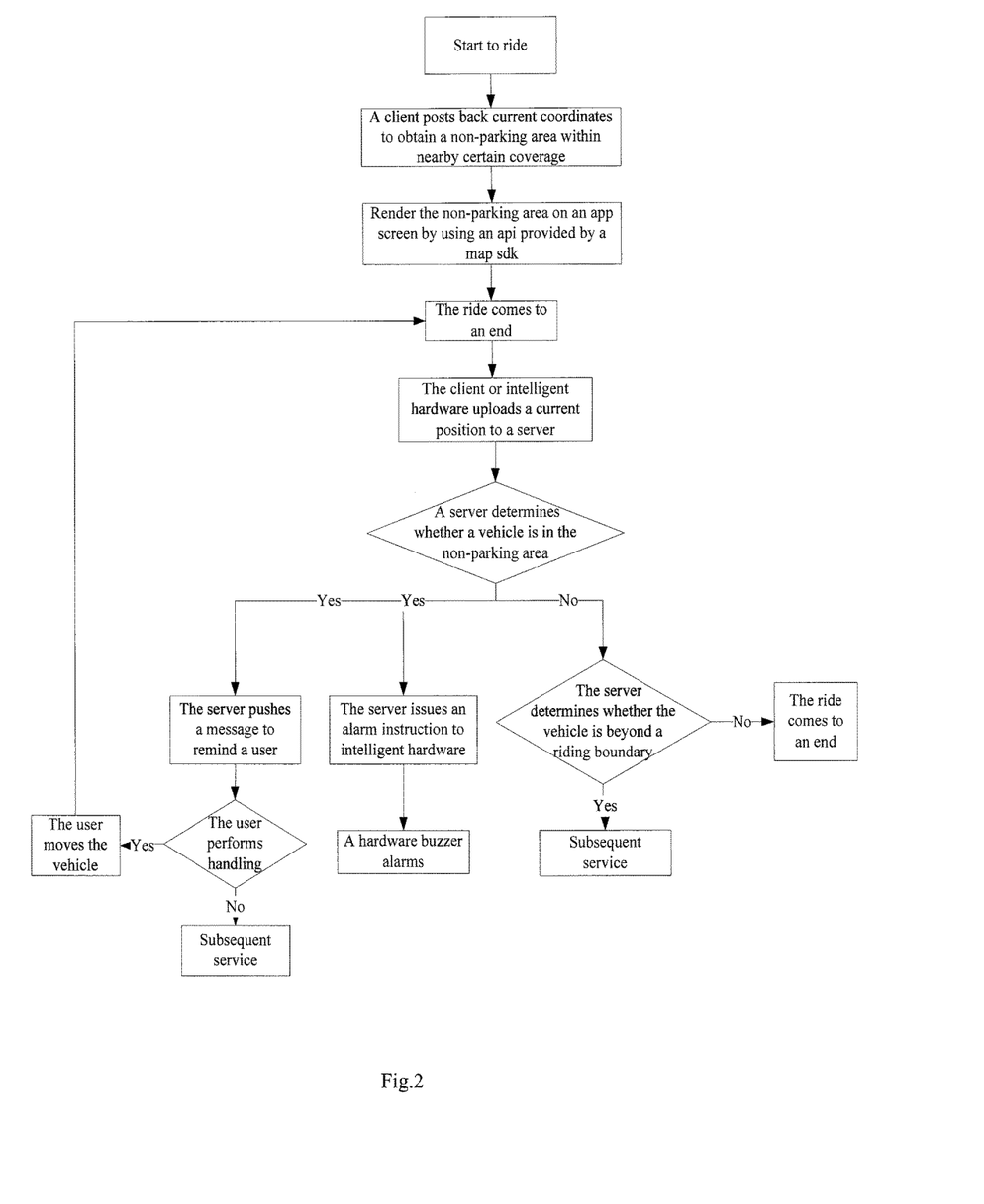
FIG. 2 is a schematic workflow diagram of a mobile terminal in a dockless vehicle-based electric fence control method according to an embodiment of the present disclosure.
Figure 3:
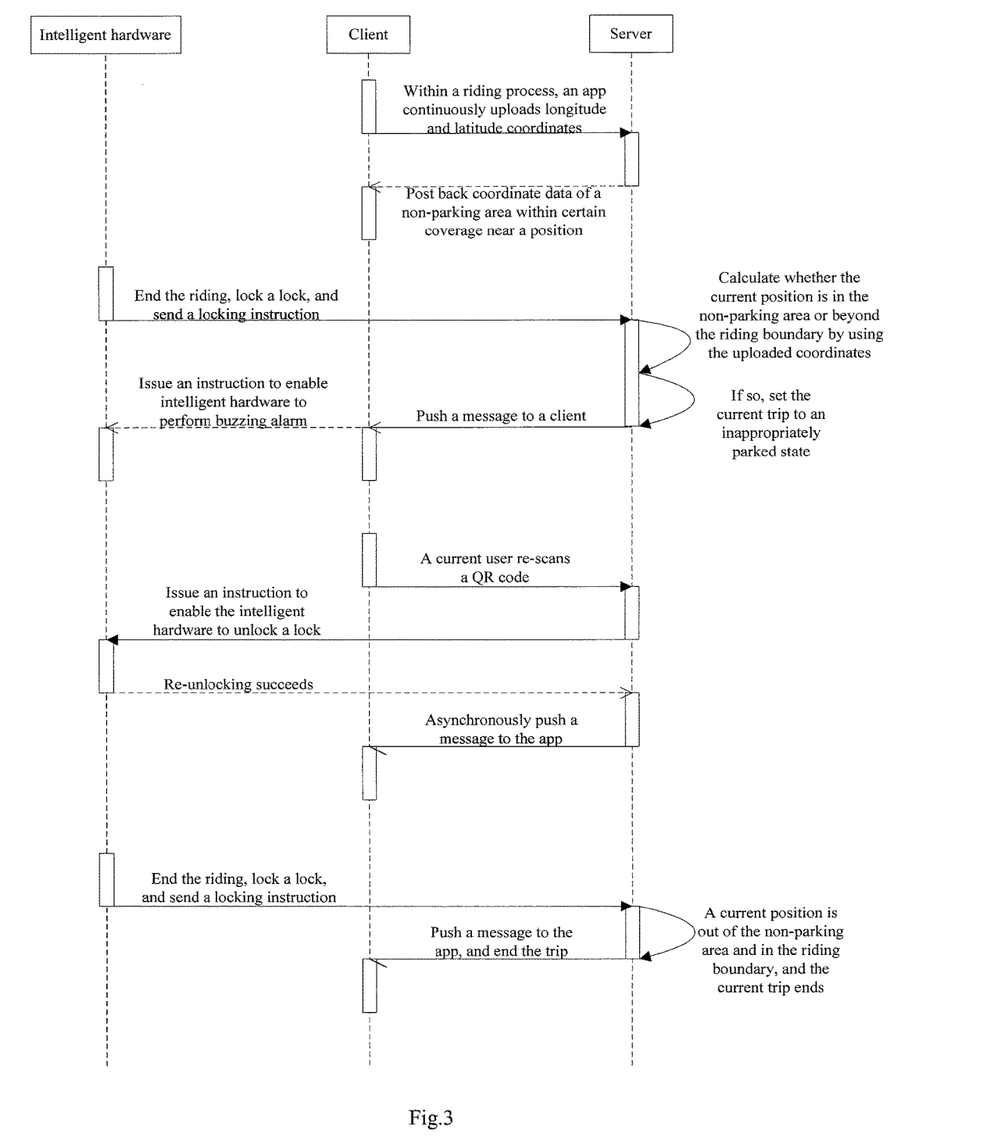
FIG. 3 is a schematic flowchart of interaction between a backend server, a mobile terminal and a vehicle in a dockless vehicle-based electric fence control method according to an embodiment of the present disclosure.

Referring to FIG. 1 to FIG. 3, a dockless vehicle-based electric fence control method disclosed in an embodiment of the present disclosure comprises:

demarcating and forming, by a backend server, a non-parking area of a vehicle by using a map engine tool, and storing the longitude and latitude coordinates at which the non-parking area is located into a database of the backend server, wherein the map engine tool herein includes but is not limited to an open map tool of a third party such as Google, Amap, Baidu, and Tencent;

when the ride comes to an end, wirelessly sending, by a mobile terminal or intelligent hardware installed in a ridden vehicle, the parking position coordinates of a current vehicle to the backend server; and receiving, by the backend server, the parking position coordinates of the vehicle for comparison with a database, determining whether the parking position coordinates of the current vehicle are located in the non-parking area, feeding back a determining result to the mobile terminal or the intelligent hardware, and waiting for subsequent handling by a user. Specifically, when it is determined that the parking position of the current vehicle is located in coverage of the defined non-parking area, the backend server pushes a message to the mobile terminal. A manner for pushing the message includes but is not limited to manners of using short message service messages, WeChat, and emails and pushing a prompt by using a mobile terminal app, so as to remind the user that the vehicle is inappropriately parked. In addition, the backend server may further issue an alarm instruction to the intelligent hardware in the vehicle for alarming. An alarm mode includes an audio alarm of a buzzer, a flickering light alarm of an LED light, and a voice prompt. If the user re-unlocks the lock, the alarm is released, and the vehicle is in a continued tenancy state. When the parking position of the vehicle is not in the non-parking area, charging may end normally, and a message indicating that the vehicle is successfully locked may further be pushed to a user's app.

In the present disclosure, a third-party map engine tool is introduced to the backend server, and the map engine tool is developed, so that the map engine tool can form and display the set non-parking areas in different manners. The longitude and latitude coordinates of all places in which the non-parking areas are located are stored together into the backend server for comparison, after being called. When the ride comes to an end, geographic coordinates of a position at which the vehicle is currently parked are sent to the backend server, and compared with the coordinates of the non-parking areas stored into the database of the server for analysis. Whether the coordinates of the position at which the vehicle is currently parked are located in coordinate coverage of the non-parking areas is determined, so that vehicle parking areas can be regulated and managed. A non-parking area is an area in which vehicles are prohibited to be parked, and a parking area is an area in which vehicles are allowed to be parked. A setting rule of the non-parking area is stipulated in compliance with local traffic regulations, or in conjunction with local temporary traffic control measures. A common example is that motor vehicle roads, military restricted zones, and hospitals should belong to the non-parking area.

A parking area is an area out of the demarcated non-parking area. To better manage vehicles in a large coverage area, for example, to effectively manage different vehicles in areas demarcated in a community-level division manner, a subdistrict-level division manner, a district and county-level division manner, a prefecture city-level division manner, a province-level division manner, and the like, avoid that a vehicle in one area is ridden to another area or ridden disorderly without a limitation, avoid a remote riding distance, a disorder caused to a management system and inconvenience caused to management of the area, a riding boundary is further set according to the method of the present disclosure. Coverage of the set riding boundary is not less than coverage of the set non-parking area. A method for setting the riding boundary is similar to the method for setting the non-parking area, which specifically comprises: demarcating and forming, by the backend server, a riding boundary of the vehicle by using the map engine tool, and storing the longitude and latitude coordinates at which the riding boundary is located into the database of the backend server; when the ride comes to an end, sending, by the mobile terminal or the intelligent hardware installed in the ridden vehicle, the parking position coordinates of the current vehicle to the backend server; and receiving, by the backend server, the parking position coordinates of the vehicle for comparison with the database, and determining whether the parking position coordinates of the current vehicle are beyond the riding boundary. When it is determined that the parking position of the current vehicle is beyond the riding boundary, the backend server pushes a message to the mobile terminal. A manner for pushing the message includes but is not limited to manners of using short message service messages, WeChat, and emails and pushing a prompt by using a mobile terminal app, so as to remind the user that the vehicle is beyond the boundary. In addition, the backend server may further issue an alarm instruction to the intelligent hardware in the vehicle for alarming. An alarm mode includes an audio alarm of a buzzer, a flickering light alarm of an LED light, and a voice prompt. If the user re-unlocks the lock, the alarm is released, and the vehicle is in a continued tenancy state. To enable the user to learn at any time and place whether a geographic position of the user is in the non-parking area, the mobile terminal measure the positions in a real-time way and wirelessly sends current position coordinates of the ridden vehicle to the backend server; and the backend server receives the current position coordinates of the ridden vehicle sent by the mobile terminal, wherein the geographic position coordinates may be sent in the longitude and latitude form, the backend server calculates a non-parking area within the coverage near the coordinate, and returns the non-parking area to the mobile terminal for displaying. There may be one or more non-parking areas within the coverage near the coordinate, and the multiple non-parking areas may have overlapped parts. In this way, by handholding the mobile terminal, the user can learn a place prohibited for parking. This helps the user to avoid the non-parking area.

Figure 4:
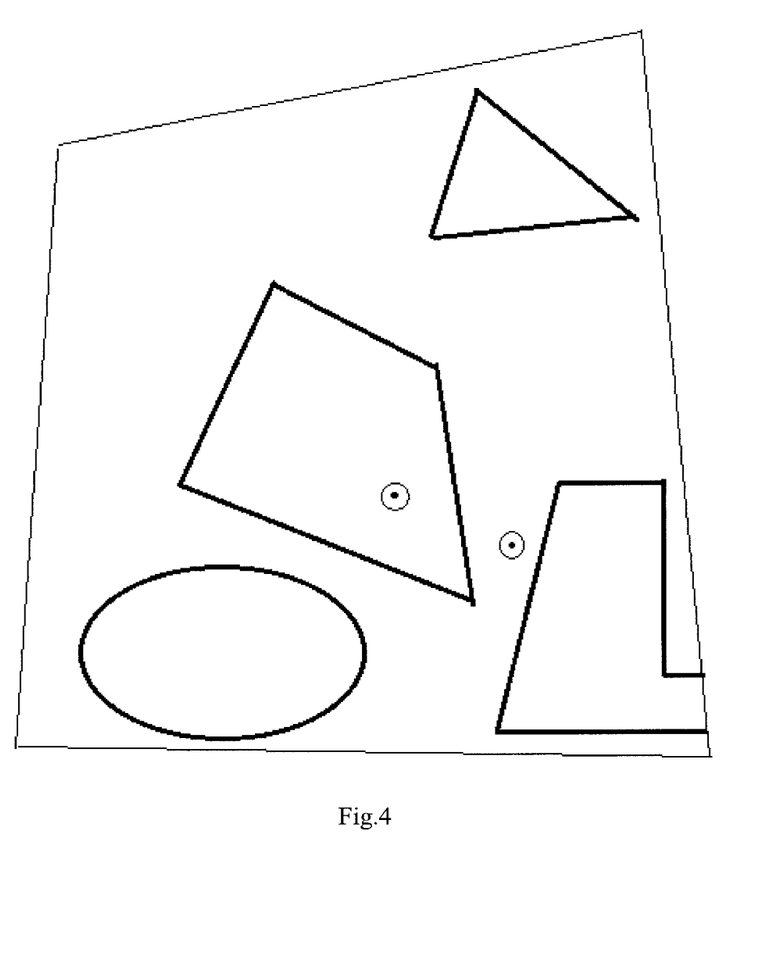
FIG. 4 is a schematic diagram of a non-parking area and a riding boundary in a dockless vehicle-based electric fence control method according to an embodiment of the present disclosure.

In this embodiment, to define the non-parking area and the riding boundary, the existing map engine tool needs to be developed. A method for performing demarcation on the map engine tool includes: redeveloping the region engine tool to enable the region engine tool to form the non-parking area and the riding boundary by drawing a geometric figure on the map by using one or more of a point, a line segment, a circle, and a polygon. Javascript is preferred as a development tool. Javascript is a client script language based on driving of objects and events and is relatively secure. In addition, Javascript also is a script language widely used during client Web development in response to various operations of the user. By means of Javascript, access is performed and Google map data is called, a polygon is drawn on a picture, and a longitude and latitude are obtained, so that the user can extend map applications conveniently. In this embodiment of the present disclosure, the non-parking area and the riding boundary are displayed by using a geometric figure, and the geometric figure may be formed in the form of a point, a line, and a plane, or a combination thereof. For some relatively small non-parking areas, considering that the existing positioning precision is 2 to 3 meters, the non-parking areas may be defined only by using points or line segments. For some relatively large building groups, the non-parking areas may be drawn by connecting multiple points to form line segments, and then connecting multiple line segments to form a polygon. A polygon area may be in a closed form or semi-closed form. The polygon herein may be a regular polygon or an irregular polygon, which includes a triangle, a quadrangle, a pentagon, and the like. Due to complexity of actual geographic positions, the more points are picked up, a more complex polygon and a more precisely defined non-parking area is to form. More preferably, smoothing processing is performed on all line segments that form the polygon in this embodiment of the present disclosure, so that the drawn lines are clearer, smoother, and more consistent with an actual environment. Referring to FIG. 4 together, FIG. 4 is a schematic diagram of a non-parking area and a riding boundary. In an embodiment shown in FIG. 4, a represents a riding boundary, for example, a community boundary, C represents a current marching position of a vehicle, and B represents a non-parking area.

In this case, the vehicle is located in the non-parking area. Other geometric figures in FIG. 4 represent various non-parking areas respectively, and the various non-parking areas may be drawn and displayed by using different geometric figures. The client only displays a non-parking area near a position at which the current vehicle is located. When the vehicle marches from C to D, two non-parking areas (B and E) near D are simultaneously displayed on the user client. A part of the boundary of the non-parking area E is overlapped with the riding boundary.

Considering that the non-parking area and the riding boundary may change as the building environment changes or due to emergence such as temporary traffic control, in a preferred embodiment of the present disclosure, a modification on the non-parking area and the riding boundary is set on the backend server. Specifically, the geometric figure drawn of the non-parking area and the riding boundary may be edited and modified. A modification manner includes re-inputting the longitude and latitude coordinates to determine new coverage, or manually dragging line segments to perform re-connection, so as to update the non-parking area and the riding boundary. The longitude and latitude coordinates of the non-parking area may be determined by manually inputting data or tapping a point on the map, and the new coverage may be circled by drawing a line between two points.

In this embodiment of the present disclosure, the formed non-parking area and riding boundary are rendered by an api interface of the map engine tool, and highlighted on a mobile terminal screen of a user. Within a riding process of the user, the mobile terminal continuously requests the backend server for data synchronization rendering, and the backend continues to update, according to the position of the riding of the user, the non-parking area near the positions of the user. The non-parking area is displayed on the mobile terminal of the user, for example, an app in a mobile phone, in the form of a geometric figure. In this way, the user can learn a nearby parking area conveniently, and is guided on a route. As the vehicle marches, the non-parking area changes accordingly, and is sent in real-time to the client for displaying. In another implementable manner of the present disclosure, when detecting that the vehicle is in a constant moving process for a long time, the backend server may intermittently sends the coverage of the non-parking area to the client. In another implementable manner of the present disclosure, the user sets a riding route, an expected time and mileage is generated, and the expected time and mileage are sent the backend server. Provided that the mileage is about to end with for example, one third left, or when the expected time is about to reach, for example, in advance of five to ten minutes, the backend server initializes synchronization and updating of the non-parking area, to reduce network traffic.

Because the riding boundary usually has relatively large coverage, when using the client to display a current riding position and a nearby non-parking area, the user may set the riding boundary as not to be displayed. Provided that the position of the riding of the user is close to the riding boundary and is detected by the backend server, positions of the riding boundary and the non-parking area are displayed simultaneously on the mobile phone app. More preferably, the riding boundary and the non-parking area may be rendered and labeled in different colors for the user to distinguish.

When the user' riding trip comes to an end, sending to the backend server, by the mobile terminal, an instruction request for finishing the trip, for example, publishes a "Confirm to end the riding" instruction by using the mobile phone app of the user. While the instruction for ending the trip is published, a vehicle parking position is also sent to the backend server. Alternatively, an electronic lock of the vehicle is locked, and after detecting that the electronic lock is locked, the intelligent hardware actively sends, to the backend server, an instruction message for ending the trip. At the same time, the geographic coordinates of a position at which the locked vehicle is located are also sent to the backend server. The backend server determines that the riding of the user ends according to the message sent by the mobile terminal or the intelligent hardware. In this case, the backend server actively detects whether the coordinates of the position at which the user parks the vehicle is located are in coordinate coverage covered by the non-parking area, and performs corresponding handling. If determining that an area in which the user parks the vehicle is a non-parking area, the backend server determines that the vehicle is in an inappropriate parking state, then sends a push message to the user and an alarm prompt to the intelligent hardware in the vehicle, and requires the user to scan a QR code to unlock the lock within a specified time, for example, three minutes or five minutes and move the vehicle out of the non-parking area. The set handling time may be displayed on the mobile terminal app of the user and counted down. If the user scans the QR code again and unlocks the lock as required, the alarm is immediately released, and the backend server displays that the vehicle is in a normal and continued tenancy, until the user parks the vehicle again but in a parking area according to the non-parking area displayed on the mobile terminal, the user can successfully end the riding. Within the set handling time, if the backend server does not detect that the vehicle is unlocked, the backend server repeatedly reminds the mobile terminal and/or repeats the alarm within the set time. Otherwise, the user suffers corresponding pecuniary losses and credit losses. A manner for unlocking the lock includes but is not limited to the manner of scanning the QR code mentioned above in this embodiment, and may further be a manner of unlocking the lock by using a bar code or entering an electronic code. If the user fails to process the vehicle within the specified time, and the parking coordinates of the vehicle do not change within the set time, after the countdown on the mobile terminal app ends, the app sends a reminding instruction to a vehicle management platform, at the same time labels a final parking position of the vehicle, and waits for handling by operation and maintenance personnel or riding by another user. In this case, the platform may send information to the user and notify the user that because the user parks the vehicle in the non-parking area and fails to move the vehicle out within the specified time despite of being prompted by the vehicle lock and informed by the app, to maintain orders in public areas, and according to the regulations in the user Code of Conduct, the vehicle is handed over to the operation and maintenance personnel of the company for handling, and the user does not need to go back to deal with it. For this reason, the user is charged some compensation as a vehicle cleanup fee.

According to the dockless vehicle-based electric fence control method disclosed in this embodiment of the present disclosure, convenience of using and parking the existing dockless shared bicycles is reserved, and legitimate interests of public and private non-parking areas are ensured. In this method, only by a dedicated APP installed on a client-side, a user can be aware of the non-parking areas and riding boundaries at a glance during a riding and parking process. Compared with the original manner in which an off-line electric fence is set by using the RFD and Bluetooth technology, a large amount of manpower and material resources can be saved. It is convenient, and in the meantime manages the parking of the vehicles. The method is an innovation of electric fence technologies in the field of shared bicycles.

By means of the description of the foregoing implementations, a person skilled in the art can clearly understand that all the implementations can be implemented in the form of software and a necessary general-purpose hardware platform, and hardware certainly. Based on such an understanding, the technical solutions of the present disclosure essentially, or the part contributing to the prior art may be implemented in the form of a software product. The software product is stored into a storage medium such as a ROM/RAM, a magnetic disk, or an optical disc, and includes several instructions for instructing a computer device (which may be a personal computer, a server, or a network device) to perform all or some of the steps of the methods described in the embodiments. Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

The invention claimed is:

1. A dockless vehicle-based electric fence control method, comprising:
    demarcating and forming, by a backend server, a non-parking area of a vehicle by using a map engine tool, and storing longitude and latitude coordinates of the non-parking area into a database of the backend server;
    when a ride comes to an end, sending, by a mobile terminal or intelligent hardware installed in a ridden vehicle, parking position coordinates of a current vehicle to the backend server; and
    receiving, by the backend server, the parking position coordinates of the vehicle, calling the database for comparison, determining whether the parking position coordinates of the current vehicle are located in the non-parking area, and feeding back a determining result to the mobile terminal and/or the intelligent hardware.

2. The method according to claim 1, wherein the method further comprises: demarcating and forming, by the backend server, a riding boundary of the vehicle by using the map engine tool again, and storing longitude and latitude coordinates of the riding boundary into the database of the backend server;
    when the ride comes to an end, sending, by the mobile terminal or the intelligent hardware installed in the ridden vehicle, the parking position coordinates of the current vehicle to the backend server; and
    receiving, by the backend server, the parking position coordinates of the vehicle for comparison with the database, and determining whether the parking position coordinates of the current vehicle are beyond the riding boundary;

wherein, the coverage of the riding boundary is not less than the coverage of the non-parking area as set.

3. The method according to claim 2, wherein, only when the vehicle is near to the riding boundary as set, the mobile terminal voluntarily display the geometric figure corresponding to riding boundary that is returned to the mobile terminal.

4. The method according to claim 2, wherein the method further comprises: when the backend server determines that a parking position of the current vehicle is located within the demarcated coverage of the non-parking area or beyond the riding boundary, pushing, by the backend server, a message to the mobile terminal and/or issuing an alarm instruction to the intelligent hardware in the vehicle for alarming.

5. The method according to claim 4, wherein the method further comprises: when the user' riding trip comes to an end, sending to the backend server, by the mobile terminal, an instruction request for finishing the trip, and a coordinate information of the real-time position; or, locking an intelligent electronic lock of the vehicle, so that the intelligent hardware sends, to the backend server, an instruction message for finishing the trip.

6. The method according to claim 5, wherein the method further comprises: when the ride comes to an end, and the backend server determines that the parking position coordinates of the vehicle are located in a non-parking area or beyond the riding boundary, pushing, by the backend server, a message to the mobile terminal and/or issuing an alarm instruction to the intelligent hardware in the vehicle for alarming, wherein the backend server further sets a handling time for the inappropriately parked vehicle and waits until the vehicle is unlocked and ridden away, and if it is not found by the backend server that the lock is re-unlocked within a set time, the backend server repeatedly reminds the mobile terminal and/or repeats the alarming.

7. The method according to claim 4, wherein the method further comprises: determining the position in a realtime way and wirelessly sending, by the mobile terminal, current position coordinates of the ridden vehicle to the backend server; and receiving, by the backend server, the current position coordinates of the ridden vehicle sent by the mobile terminal, calculating a non-parking area and/or a riding boundary within a coverage near to the coordinates, and returning the non-parking area and/or the riding boundary to the mobile terminal for displaying.

8. The method according to claim 7, wherein a method for demarcating the map engine tool comprises: redeveloping a region engine tool to enable the region engine tool to draw a geometric figure on a map by using one or more of a point, a line segment, a circle, and a polygon to form the non-parking area and the riding boundary.

9. The method according to claim 8, wherein the method further comprises: rendering, by an api interface of the map engine tool, the formed non-parking area and riding boundary, and highlighting the formed non-parking area and riding boundary on a mobile terminal screen of a user, so that within a riding process of the user, the mobile terminal continuously requests the backend server for data synchronization rendering.

10. The method according to claim 8, wherein the method further comprises: editing and modifying the geometric figure drawn of the non-parking area and the riding boundary, to complete updating of the non-parking area and the riding boundary.

* * * * *